United States Patent [19]

Head et al.

[11] Patent Number: 4,908,297

[45] Date of Patent: Mar. 13, 1990

[54] COATING COMPOSITIONS

[75] Inventors: Robert A. Head, Upton; Steven Johnson, Runcorn, both of England

[73] Assignee: Imperial Chemical Industries PLC, Millbank, England

[21] Appl. No.: 94,699

[22] Filed: Sep. 9, 1987

[30] Foreign Application Priority Data

Sep. 10, 1986 [GB] United Kingdom ............... 8621793

[51] Int. Cl.$^4$ ........................................ C07L 125/077
[52] U.S. Cl. .................................... 430/284; 522/96; 522/97; 522/98; 428/378; 65/3.4; 427/54.1; 526/245; 526/246; 350/96.1
[58] Field of Search ................. 430/284; 522/96, 97, 522/98; 428/378; 65/3.4; 427/54.1; 526/245, 246; 350/96.1

[56] References Cited

U.S. PATENT DOCUMENTS

| 4,054,592 | 10/1977 | Dear | 560/25 |
| 4,508,916 | 4/1985 | Newell | 556/420 |

FOREIGN PATENT DOCUMENTS

| 36374 | 2/1986 | Japan | 522/96 |
| 101507 | 5/1986 | Japan | 522/97 |

Primary Examiner—Paul R. Michl
Assistant Examiner—Thorl Chea
Attorney, Agent, or Firm—Cushman, Darby & Cushman

[57] ABSTRACT

Coating Compositions Photocurable coating compositions useful for coating optical glass fibres comprising:
(a) a polyethylenically unsaturated polyurethane derived from a polyol having pendent fluoroalkyl groups;
(b) an ethylenically unsaturated monomer which is a liquid solvent for the polyethylenically unsaturated polyurethane and is copolymerizable therewith, and
(c) a photo-initiator composition.

15 Claims, No Drawings

COATING COMPOSITIONS

This invention relates to coating compositions and more particularly to photocurable coating compositions useful in the production of coated glass optical fibres.

Optical glass fibers are widely used in the communications field because of their ability to carry large amounts of information over long distances. Glass fibres are inherently strong having an intrinsic strength of the order of $3 \times 10^9 N \, m^{-2}$ (ref. "Optical fibres for transmission", J. E. Midwinter, 1979, John Wiley and sons). However, strength retention is very much dependent upon the environment of the fibre. Abrasion, even with micron sized particles, produces microscopic flaws in the glass surface which are thought to propagate by a mechanism first put forward by Griffith and result in eventual fibre fracture. Another source of fibre strength loss arises from contact with moisture and ions in solution. It is a well known fact that hydrolysis of the surface bonds in silica glass occurs rapidly in the presence of water containing ions e.g. $Na^+$, and results in marked strength deterioration and eventual fracture. In order to retain the high strength of optical fibres, it is therefore necessary to protect them from environmental effects, such as abrasion, as well as moisture and contact with ions. In an attempt to achieve such protection, coatings have been applied to the freshly drawn glass fibres as an integral part of the production process.

Coating systems proposed for optical fibres have included solvent borne lacquers, two-pack systems and thermally cured silicone rubbers but none of these has been entirely satisfactory because of their low application and cure rates and also because of inadequate properties. To overcome the problem of low production rates, it has been proposed to use photocurable coatings and especially ultraviolet curable coatings which can be cured rapidly using commercially available high intensity UV lamp systems. The coatings obtained do not always have a satisfactory combination of properties however.

Thus, a satisfactory coating applied directly onto the glass during the fibre spinning process should possess several important properties. The resin must be converted into a stable polymer by exposure to low intensities of ultra violet light to facilitate rapid production rates for the fibres. Additionally, the coating must also be soft, typically having a tensile modulus below 10 MPa, in order to buffer the fibre from lateral forces such as those encountered in the subsequent cabling processes or in use, while having sufficient strength to resist physical removal from the fibre. The glass transition temperature should also be low so that no centres of microbending are produced on cooling down to temperatures as low as $-40°$ C. and preferably to $-60°$ C. This soft coating or primary buffer should also provide an effective barrier to ingress of moisture and transport of ions to the glass surface. Further, in order to remove the stray light modes which leave the waveguide core, the refractive index should be 1.48 or higher.

Because of the difficulty of providing the required softness and toughness in a single coating, optical fibres are frequently provided with two coatings, a soft primary (inner) buffer coating, having an ability to compensate for the effects of differential thermal expansion and a secondary (outer) high modulus coating providing the necessary toughness and resistance to abrasion and chemical attack.

It has now been found that coatings having a desirable combination of properties suitable for application directly onto the glass fibre, especially high UV sensitivity, low tensile modulus, low glass transition temperature and particularly low water uptake and permeability with satisfactory refractive index may be obtained from coating compositions based upon unsaturated polyurethanes having pendent fluoroalkyl groups.

Thus, according to the invention, there are provided photocurable coating compositions comprising:

(a) a polyethylenically unsaturated polyurethane derived from a polyol having pendent fluoroalkyl groups;

(b) an ethylenically unsaturated monomer which is a liquid solvent for the polyethylenically unsaturated polyurethane and is copolymerisable therewith, and (c) a photo-initiator composition.

Component (a) of the coating compositions of the invention is preferably a polyurethane polyacrylate containing acrylate or substituted acrylate groups of the formula:

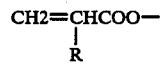

wherein R represents an optionally substituted lower alkyl radical, for example methyl or carboxymethyl, or, preferably, hydrogen.

In general, component (a) is a reaction product of a polyol having pendent fluoroalkyl groups, an organic polyisocyanate and an ethylenically unsaturated monomer containing a single hydroxyl group, the ratio of NCO groups in the polyisocyanate to OH groups in the polyol being greater than 1:1.

Suitable polyols having pendent fluoroalkyl groups include polyols having pendent groups of the formula:

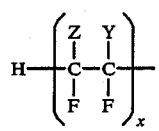

wherein Y represents F and Z represents Cl or $F(CF_2)_n$— wherein n is an integer from 0 to 10 or Y and Z together form a —$(CF_2)_m$— chain wherein m represents an integer from 2 to 4 and x is a positive integer which must be 1 when Z is Cl or $F(CF_2)_n$—.

Such fluorine-containing polyols may be obtained by the free radical addition of a fluoro-olefin having the general formula:

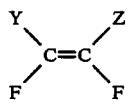

wherein Y and Z are as defined above to a polyol wherein each hydroxyl group is directly attached to a group of the formula:

wherein p is an integer of at least 4.

Fluoro-olefins of formula (2) which may be used in the preparation of the fluorine-containing polyols include tetrafluoroethene, chlorotrifluoroethene, hexafluoropropene, perfluorinated nonene-1, hexafluorocyclobutene, octafluorocyclopentene and decafluorocyclohexene.

Examples of polyols wherein each hydroxyl group is directly attached to a group of formula (3) include 1,4-butanediol, 1,6-hexanediol and 1,10-decanediol, and polyesters derived therefrom.

Particularly useful polyols for use in making the fluorine-containing polyols include polytetramethylene glycols such as may be prepared by the polymerisation of tetrahydrofuran in the presence of an acidic catalyst such as boron trifluoride. The polytetramethylene glycols suitably have molecular weights in the range from 162 to 5000, especially from 500 to 3000 and more especially from 650 to 2000.

The free radical addition of the fluoro-olefin to the polyol is performed under conditions in which free radicals are generated. Such conditions have been fully described in the prior art and include the use of known free radical generators, for example azo compounds and the peroxy compounds such as the peroxides, persulphates, percarbonates and perborates as well as ultraviolet and gamma radiation. Di-t-butyl peroxide has been found to be particularly effective.

The free radical addition may be carried out at normal or elevated temperatures, for example temperatures up to 200° C. Solvents are not usually necessary when the polyol is a liquid at the reaction temperature but inert solvents may be used when required. Separation of the reaction product from any remaining starting materials and any solvent used may be effected using conventional techniques.

The fluorine content of the fluorine-containing polyols may be varied by varying the constitution and/or amount of the fluoro-olefin and/or by varying the free radical addition conditions. In general, the fluorine-containing polyols should have a fluorine content in the range from 5 to 60% on a weight basis, although the possibility of using polyols having lower or higher fluorine contents is not excluded.

Products obtained by the addition of the fluoro-olefins to non-polymeric polyols may contain, on average, up to 1 or even more groups of Formula 1 per polyol molecule. Polymeric fluorine-containing polyols, for example polyether polyols, may contain, on average, up to 1 or more groups of Formula 1 per monomer residue.

Mixtures of fluorine-containing polyols may be used, for example mixtures of polyols having different fluorine contents and/or different molecular weights.

Organic polyisocyanates which may be used in the preparation of component (a) include the aliphatic, cycloaliphatic and aromatic diisocyanates that have been fully described in the polyurethane literature. Suitable aliphatic and cycloaliphatic diisocyanates include hexamethylene, isophorone and 4,4'-dicyclohexylmethane diisocyanates and suitable aromatic diisocyanates include phenylene, 2,4-tolylene, 2,6-tolylene and 4,4'-diphenylmethane diisocyanates. Mixtures of polyisocyanates may be used, for example mixtures of tolylene diisocyanate or diphenylmethane diisocyanate isomers. Other suitable mixtures include the commercial products, commonly known as "crude MDI", containing diphenylmethane diisocyanates together with higher functionality polymethylene polyphenyl polyisocyanates, such mixtures being obtained by the phosgenation of crude aniline-formaldehyde reaction products. It is preferred to use a diisocyanate in which the two isocyanate groups differ in reactivity, for example tolylene diisocyanate or isophorone diisocyanate.

The hydroxyl containing ethylenically unsaturated monomer used in the preparation of component (a) is preferably a hydroxyalkyl acrylate or methacrylate containing from two to four carbon atoms in the hydroxyalkyl group. Examples of such compounds include 2-hydroxyethyl and 2-hydroxypropyl acrylates and methacrylates. The preferred agent is 2-hydroxyethyl acrylate.

In preparing component (a), the organic polyisocyanate may be reacted with the polyol having pendent fluoroalkyl groups and the hydroxyl-containing monomer in any order. Thus, the fluorine-containing polyol may be reacted with one mole of diisocyanate per hydroxyl equivalent and the isocyanate-terminated polyurethane product obtained may then be reacted with sufficient hydroxyl-containing monomer to form the required polyethylenically unsaturated polyurethane. An alternative process is to react a diisocyanate with one molar proportion of the hydroxyl containing monomer to form an ethylenically unsaturated monoisocyanate which is then reacted in stoichiometric proportions with the fluorine-containing polyol. A further variant is to react the diisocyanate with a mixture of the polyol and the hydroxy monomer in a single step.

The preparation of component (a) may be performed in the presence of conventional urethane catalysts such as tertiary amines and/or tin compounds, for example dibutyltin dilaurate, and inert solvents which may be ethylenically unsaturated monomers required in the compositions of the invention as component (b).

The ethylenically unsaturated monomer present as component (b) of the compositions of the invention is preferably an ester of acrylic or methacrylic acid. Acrylic acid esters which provide homopolymers having a Tg not above 20° C. are especially preferred. Such esters include those of the formula:

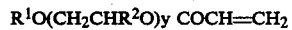

$R^1O(CH_2CHR^2O)_y COCH=CH_2$ wherein $R^1$ represents an alkyl or aryl radical, $R^2$ represents hydrogen or methyl and y is an integer from 2 to 5. Mixtures of such esters may be used and it is often advantageous to include up to 10% of a di- or tri-acrylate, for example triethylene glycol diacrylate or alkoxylated trimethylolpropane triacrylate. Other vinyl diluents commonly used in the radiation curing industry may also be employed.

The relative proportions of polyethylenically unsaturated polyurethane and ethylenically unsaturated monomer in the compositions of the invention will depend upon the required viscosity of the compositions and the required properties of the cured product. Typical compositions contain from 5 to 45, especially 10 to 30, parts by weight of unsaturated monomer per 100 total parts by weight of unsaturated polyurethane plus unsaturated monomer.

The photo-initiator composition present as component (c) of the compositions of the invention may absorb visible or ultraviolet radiation. The photo-initiator composition may comprise, as the radiation-absorbing component thereof, conventional agents such as benzophenone and derivatives thereof, acetophenone and derivatives thereof, benzoin, benzil and benzil acetals. These photo-initiators may be used singly or in mixtures and are usually present in amounts of up to about 10% of the coating composition on a weight basis, especially from 2 to 6%. Amine accelerators such as methyldiethanolamine or diethylaminoethyl benzoate or polythiols may be included to enhance the cure.

The coating compositions of the invention may also contain such ingredients as are commonly employed in photocurable coating compositions, for example flatting agents, slip agents, wetting agents, adhesion promoters, pigments and stabilisers.

If desired, and it may often be advantageous, the polyethylenically unsaturated polyurethane component of the coating composition of the invention may contain residues not only of the polyol having pendent fluoroalkyl groups but also a polyol or polyamine having no pendent fluoroalkyl groups.

Thus, according to a further embodiment of the invention, there are provided photocurable coating compositions comprising:
  (a) a polyethylenically unsaturated polyurethane derived from:
    (i) from 1 to 99% by weight of a polyol having pendent fluoroalkyl groups, and
    (ii) from 99 to 1% by weight of a fluorine-free polyol or polyamine;
  (b) an ethylenically unsaturated monomer which is a liquid solvent for the unsaturated urethane component and is copolymerisable therewith, and
  (c) a photo-initiator composition.

The polyethylenically unsaturated polyurethane component required by the coating compositions of this embodiment of the invention may be prepared by reacting the organic polyisocyanate with a mixture of the fluorine-containing polyol and the fluorine-free polyol or polyamine. Alternatively, the polyisocyanate may be reacted with the fluorine-containing polyol and the fluorine-free polyol or polyamine sequentially in any order and in any number of steps. A further possibility is to combine two unsaturated polyurethanes which have been prepared separately, one being derived from a fluorine-containing polyol and the other from a fluorine-free polyol or polyamine.

Thus, component (a) can be an unsaturated urethane component comprising from 1 to 99% by weight of a polyethylenically unsaturated polyurethane derived from a polyol having pendent fluoroalkyl groups and from 99 to 1% by weight of a polyethylenically unsaturated polyurethane derived from a fluorine-free polyol or polyamine.

The fluorine-free polyols which may be used generally have molecular weights in the range 62 to 5000 and particularly include the polyols, especially diols, used or proposed to be used in the production of elastomeric polyurethanes. Such polyols include simple alkane diols, polyester diols including polylactone and polycarbonate diols and especially polyether diols such as polyethylene glycols, polypropylene glycols, ethylene oxide/propylene oxide block and random copolymers and polytetramethylene glycols.

The fluorine-free polyamines which may be used generally have molecular weights in the range 60 to 5000 and particularly include those polyamines containing two primary or secondary amino groups used or proposed to be used in the production of elastomeric polyureas. Such polyamines include simple aliphatic aromatic diamines and amino-terminated polyethers.

Mixtures of fluorine-free polyols and/or polyamines may be used.

It is desirable, of course, that the fluorine-containing polyol and fluorine-free polyol or polyamine are so chosen that no compatibility problems arise. Particularly useful compositions contain an unsaturated urethane component comprising from 5 to 50%, especially from 10 to 30%, by weight of a di-acrylated polyurethane derived from a polyol obtained by the free radical addition of hexafluoropropene to polytetramethylene glycol or molecular weight from 500 to 3000, especially from 650 to 2000, and from 95 to 50%, especially from 70 to 90%, by weight of a di-acrylated polyurethane derived from a polyoxyalkylene diol of molecular weight from 500 to 2000, especially from 600 to 1200.

Typically, the photocurable coating compositions of the invention are applied to freshly drawn glass optical fibres by drawing the fibres through a bath containing the composition at a temperature between room temperature and 60° C., at a rate of about 1 to above 10 meters per second, to give a coating of between 30 and 70 microns. The coated fibres are then subjected to suitable electromagnetic radiation, for example ultraviolet radiation, to cure the coating. Glass optical fibres having a protective coating are thus obtained, the coating exhibiting excellent resistance to microbending over a wide temperature range. If desired, resistance to external agents may be increased by the provision in known manner of a secondary coating.

Thus, the invention also provides a process for the production of coated glass optical fibres comprising the steps of:
  (a) drawing a glass fibre through a photocurable coating composition as hereinbefore defined and thereby forming a sheath of the composition on the fibre, and
  (b) subjecting the sheathed fibre to electromagnetic radiation to cure the sheath of photocurable composition.

The invention also provides coated glass optical fibres obtained by this process.

The invention is illustrated but not limited by the following Examples:

EXAMPLE 1

Polytetramethylene glycol of molecular weight 650(175 g), ditertiarybutylperoxide (1 g) and hexafluoropropene (175 g) were charged to an autoclave and heated to 150° C. with constant stirring. After 1.5 hr. the autoclave was cooled and vented and the clear mobile liquid product (321 g) was discharged. The product was further purified by heating at 85° C. for 2 hr. whilst being purged with nitrogen. The presence of $-CF_2CFHCF_3$ groups pendent to the polyether chain was shown by $^{19}F$ and $^1H$ NMR and the homogeneity of the product was confirmed by GPC. The hydroxyl number of the diol product was determined as 82.7 (mg KOH $g^{-1}$) indicating an average molecular weight of 1357.

EXAMPLE 2

A fluorinated diol (400 g), prepared as in Example 1, was added to a mixture of isophorone diisocyanate (131.6 g), dibutyltindilaurate (1.31 g) and 3,5-ditertiarybutylphenol (0.3 g) at 40°–45° C. over a period of 5 hr. The mixture was then heated to 50°–55° C. until the isocyanate content had reduced to half of the initial value. 2-Hydroxyethylacrylate (68.7 g) was then added over 0.5 hr. and the reaction heated at 45°–60° C. until no free isocyanate remained.

EXAMPLE 3

Polypropylene glycol of molecular weight 1200 (1500 g) was added to a mixture of isophorone diisocyanate (653.2 g), dibutyltindilaurate (6.6 g) and 3,5-ditertiarybutylphenol (1.13 g) at 40°–45° C. over a period of 5 hr. 2-Hydroxyethylacrylate (341.4 g) was then added over a period of 1 hr. and the resulting product heated at 60° C. until no free isocyanate remained.

EXAMPLE 4

A 5 liter reaction vessel was charged with isophorone diisocyanate (247 g), 3,5-ditertiarybutylphenol (0.92 g) and dibutyltindilaurate (2.47 g) and 1,4-butanediol (50 g) was added over a 1 hr. period while the temperature was maintained at approx. 55° C. Polypropylene glycol of molecular weight 1200 (1165 g) was then rapidly added to the vessel and the resulting mixture heated at 55° C. for 2 hr. A mixture of isophorone diisocyanate (247 g) and dibutyltindilaurate (2.47 g) was introduced into the vessel. Finally 2-hydroxyethylacrylate (129 g) was added over a 1 hr. period and the resulting product heated at 50°–55° C. until no free isocyanate remained.

EXAMPLE 5

2-Hydroxyethylacrylate (106 g) was added to a mixture of isophorone diisocyanate (202 g), dibutyltindilaurate (2.02 g) and 3,5-ditertiarybutylphenol (0.75 g) in a 5 liter reaction vessel over a period of 1 hr. after which the mixture was heated to 40°–45° C. for 1 hr. Rapid addition of polypropylene glycol of molecular weight 1200 (954 g) was then performed and the product heated for 1.5 hr. at 45° C. At this stage an infra-red spectrum of the material indicated the absence of free isocyanate groups. A mixture of isophorone diisocyanate (202 g) and dibutyltindilaurate (2.02 g) was then added quickly to the vessel and the resulting mixture heated for 1.5 hr. at 45° C. Slow addition of 1,4-butanediamine followed by heating to 40° C. for about 2 hr. gave a product which contained no free isocyanate groups as evidenced by infra-red spectroscopy.

EXAMPLE 6

A 5 liter reaction vessel was charged with isophorone diisocyanate (235.9 g), 3,5-ditertiarybutylphenol (0.90 g) and dibutyltindilaurate (2.36 g) and 1,4-butanediol (47.75 g) was added over a 1 hr. period while the temperature was maintained at approx. 55° C.

A mixture of fluorinated diol (257.6 g), as prepared in Example 1, and polypropylene glycol of molecular weight 1200 (906.7 g) was then rapidly added to the vessel and the resulting mixture heated at 55° C. for 5 hr. A mixture of isophorone diisocyanate (235.9 g) and dibutyltindilaurate (2.36 g) was introduced into the vessel. Finally 2-hydroxyethylacrylate (123.2 g) was added over a 1 hr. period and the resulting product heated at 50°–55° C. until no free isocyanate remained.

EXAMPLE 7

2-Hydroxyethylacrylate (110 g) was added to a mixture of isophorone diisocyanate (211 g), dibutyltindilaurate (2.11 g) and 3,5-ditertiarybutylphenol (0.81 g) in a 5 liter reaction vessel over a period of 1 hr. after which the mixture was heated to 40°–45° C. for 1 hr. Rapid addition of a mixture of fluorinated diol (231 g), as prepared in Example 1, and polypropylene glycol of molecular weight 1200 (811 g) was then performed and the product heated at 45° C. until an infra-red spectrum of the material indicated the absence of free isocyanate groups. A mixture of isophorone diisocyanate (211 g) and dibutyltindilaurate (2.11 g) was then added quickly to the vessel and the resulting mixture heated for 2 hr. at 45° C. Slow addition of 1,4-butanediamine followed by heating to 45° C. for about 2 hr. gave a product which contained no free isocyanate groups as evidenced by infra-red spectroscopy.

EXAMPLES 8 TO 16

Blends of urethane acrylate oligomers described in Examples 2 and 3 were formulated together with reactive diluents and photoinitiator as described below. The resulting formulations were then cast as thin films of between 80 and 120 micron thickness and cured with 1.28 Joules cm$^{-2}$ of ultra-violet light. Examples 8, 11 and 13 are included to illustrate the properties produced in absence of the fluorine containing oligomers.

| | Ex. 8 | Ex. 9 | Ex. 10 | Ex. 11 | Ex. 12 |
|---|---|---|---|---|---|
| Oligomer(Ex. 2) | 0.0 | 8.4 | 15.2 | 0.0 | 9.5 |
| Oligomer(Ex. 3) | 74.2 | 68.4 | 60.5 | 83.5 | 75.8 |
| Diluent 1 | 0.0 | 0.0 | 0.0 | 9.0 | 9.0 |
| Diluent 2 | 11.4 | 10.2 | 10.8 | 0.0 | 0.0 |
| Diluent 3 | 11.4 | 10.2 | 10.8 | 3.0 | 3.0 |
| Irgacure 651* | 3.0 | 3.0 | 3.0 | 3.0 | 3.0 |
| Viscosity(Poise at 20° C.) | 84.0 | 94.0 | 89.0 | 84.0 | 85.0 |
| Tensile Mod(MPa) | 13.4 | 11.5 | 11.7 | 7.0 | 6.2 |
| Tensile Str(MPa) | 2.8 | 3.3 | 3.2 | 2.0 | 2.2 |
| Water vapour permeability (gµ/m$^2$/day @ 95% RH and 40° C.) | | | | 53128 | 36989 |

Diluent 1 = Ethoxylated ethyl acrylate
Diluent 2 = Alkoxylated phenyl acrylate
Diluent 3 = Ethoxylated TMPTA
*Trade name from Ciba-Geigy

| | Ex. 13 | Ex. 14 | Ex. 15 | Ex. 16 |
|---|---|---|---|---|
| Oligomer(Ex. 2) | 0.0 | 16.4 | 41.0 | 82.0 |
| Oligomer(Ex. 3) | 82.0 | 65.6 | 41.0 | 0.0 |
| Diluent 1 | 11.3 | 11.3 | 11.3 | 11.3 |
| Diluent 3 | 3.7 | 3.7 | 3.7 | 3.7 |
| Irgacure 651 | 3.0 | 3.0 | 3.0 | 3.0 |
| Water Uptake(% w/w) | 3.0 | 2.5 | 1.9 | 1.1 |
| Water Absorbed(% w/w) | 4.0 | 3.7 | 2.9 | 1.8 |
| Extractables(% w/w) | 1.0 | 1.2 | 1.0 | 0.7 |

EXAMPLES 18 TO 29

Blends of urethane acrylate oligomers described in Examples 2, 4 & 5 were formulated together with reactive diluents and photoinitiator as described below. The resulting formulations were then cast as thin films of between 80 and 120 micron thickness and cured with 1.28 Joules cm$^{-2}$ of ultra-violet light. In Examples 26 and 29 the oligomer was prepared from a mixture of polyols as described in Examples 6 and 7. Examples 18, 22, 24 and 27 are included to illustrate the inferior properties obtained in the absence of the fluorinated materials.

| | Ex. 18 | Ex. 19 | Ex. 20 | Ex. 21 | Ex. 22 | Ex. 23 |
|---|---|---|---|---|---|---|
| Oligomer (Ex. 2) | 0.0 | 6.0 | 12.4 | 34.5 | 0.0 | 34.5 |
| Oligomer (Ex. 4) | 64.1 | 60.1 | 49.7 | 34.5 | 68.7 | 34.5 |
| Oligomer (Ex. 5) | 0.0 | 0.0 | 0.0 | 0.0 | 0.0 | 0.0 |
| Oligomer (Ex. 6) | 0.0 | 0.0 | 0.0 | 0.0 | 0.0 | 0.0 |
| Diluent 2 | 32.9 | 30.9 | 34.9 | 28.0 | 22.6 | 22.4 |
| Diluent 3 | 0.0 | 0.0 | 0.0 | 0.0 | 0.0 | 0.0 |
| Diluent 4 | 0.0 | 0.0 | 0.0 | 0.0 | 5.7 | 5.6 |

-continued

| | Ex. 18 | Ex. 19 | Ex. 20 | Ex. 21 | Ex. 22 | Ex. 23 |
|---|---|---|---|---|---|---|
| Irgacure 651 | 3.0 | 3.0 | 3.0 | 3.0 | 3.0 | 3.0 |
| Tensile Modulus (MPa) | 2.7 | 2.5 | 2.25 | 2.1 | 3.03 | 2.4 |
| Shore Hardness (A) | 50 | 50 | 50 | 50 | 53 | 52 |
| Refractive Index | 1.51 | 1.504 | 1.50 | 1.491 | 1.51 | 1.492 |
| Tg(deg.C) | −34 | −35 | −36 | −38 | −31 | −35 |
| Water Uptake (% w/w) | 2.9 | 2.5 | 1.8 | 0.9 | 4.5 | 2.3 |
| Water Absorbed (% w/w) | 3.2 | 2.9 | 2.3 | 1.2 | 5.0 | 2.8 |
| Extractables (% w/w) | 0.3 | 0.4 | 0.5 | 0.3 | 0.5 | 0.5 |

Diluent 4 = N—vinylpyrrolidinone

| | Ex. 24 | Ex. 25 | Ex. 26 | Ex. 27 | Ex. 28 | Ex. 29 |
|---|---|---|---|---|---|---|
| Oligomer (Ex. 2) | 0.0 | 34.5 | 0.0 | 0.0 | 34.5 | 0.0 |
| Oligomer (Ex. 4) | 61.3 | 34.5 | 0.0 | 0.0 | 0.0 | 0.0 |
| Oligomer (Ex. 5) | 0.0 | 0.0 | 0.0 | 6.0 | 3.5 | 0.0 |
| Oligomer (Ex. 6) | 0.0 | 0.0 | 66.8 | 0.0 | 0.0 | 0.0 |
| Oligomer (Ex. 7) | 0.0 | 0.0 | 0.0 | 0.0 | 0.0 | 66.8 |
| Diluent 2 | 28.6 | 22.4 | 26.7 | 32.9 | 29.0 | 26.7 |
| Diluent 3 | 7.1 | 5.6 | 3.5 | 0.0 | 0.0 | 3.5 |
| Diluent 4 | 0.0 | 0.0 | 0.0 | 0.0 | 0.0 | 0.0 |
| Irgacure 651 | 3.0 | 3.0 | 3.0 | 3.1 | 3.0 | 3.0 |
| Tensile Modulus (MPa) | 4.45 | 3.6 | 2.4 | 1.66 | 2.0 | 2.3 |
| Shore Hardness (A) | 66 | 55 | 53 | 41 | 44 | 46 |
| Refractive Index | 1.505 | 1.49 | 1.50 | 1.508 | 1.49 | 1.50 |
| Tg(deg.C) | −32 | −36 | −36 | −32 | −35 | — |
| Water Uptake (% w/w) | 2.1 | 0.9 | 1.6 | 3.5 | 1.0 | 1.0 |
| Water Absorbed (% w/w) | 3.0 | 1.2 | 2.1 | 4.7 | 1.6 | 1.5 |
| Extractables (% w/w) | 0.9 | 0.3 | 0.5 | 1.25 | 0.6 | 0.5 |

EXAMPLE 30

Glass optical fibres were drawn from a preform and coated in line with the ultra-violet curable primary resin described in Example 21 at a drawing rate which exceeded 10 (ten) meters per second. The resulting fibre had very low signal attenuation when measured at 1300 nm and 1550 nm and the attenuation did not increase when the fibre was subject to temperature cycling between +85° and −40° C. The coating retained good adhesion to the glass fibre when subject to high humidity (95% RH at 40° C.) and following immersion in water.

We claim:

1. An optical glass fibre having a protective coating obtained by photocuring thereon a photocurable coating composition comprising:
   (a) a polyethylenically unsaturated polyurethane derived from a polyol having pendent fluoroalkyl groups of the formula:

wherein Z represents Cl or F(CF2)n— wherein n is an integer from 0 to 10,
   (b) an ethylenically unsaturated monomer which is a liquid solvent for the polyethylenically unsaturated polyurethane and is copolymerisable therewith, and
   (c) a photo-initiator composition.

2. A composition according to claim 1 wherein the polyethylenically unsaturated polyurethane is a reaction product of a polyol having pendent fluoroalkyl groups, an organic polyisocyanate and an ethylenically unsaturated monomer containing a single hydroxyl group, the ratio of NCO groups in the polyisocyanate to OH groups in the polyol being greater than 1:1.

3. A composition according to claim 2 wherein the polyol having pendent fluoroalkyl groups is a polyol having pendent groups of the formula:

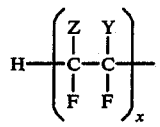

wherein Y represents F and Z represents Cl or F(CF2)n— wherein n is an integer from 0 to 10 or Y and Z together form a —(CF2)m— chain wherein m represents an integer from 2 to 4 and x is a positive integer which must be 1 when z is Cl or F(CF2)n—.

4. An optical glass fibre having a protective coating obtained by photocuring thereon a photocurable coating composition comprising:
   (a) a polyethylenically unsaturated polyurethane derived from a polyol having pendent fluoroalkyl groups of the formula:

wherein Z represents Cl or F(CF2)n— wherein n is an integer from 0 to 10,
   (b) an ethylenically unsaturated monomer which is a liquid solvent for the polyethylenically unsaturated polyurethane and is copolymerisable therewith, and
   (c) a photo-initiator composition, wherein the polyol having a pendent fluoroalkyl groups is a product of the free radical addition of a fluoro-olefin having the general formula:

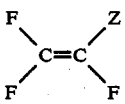

wherein Y and Z are as defined above, to a polyol wherein each hydroxyl group is directly attached to group of the formula:

$(CH_2)_pO$ wherein p is an integer of at least 4.

5. A composition according to claim 4 wherein the fluro-olefin is tetrafluoroethene, chlorotrifluoroethene or hexafluoropropene.

6. A composition according to claim 4 wherein the polyol is a polytetramethylene ether glycol having a molecular weight in the range 162 to 5000.

7. A composition according to claim 6 wherein the polytetramethylene ether glycol has a molecular weight in the range 500 to 3000.

8. A composition according to claim 2 wherein the organic polyisocyanate is a diisocyanate in which the two isocyanate groups differ in reactivity.

9. A composition according to claim 8 wherein the diisocyanate is isophorone diisocyanate.

10. A composition according to claim 2 wherein the ethylenically unsaturated monomer containing a single hydroxyl group is a hydroxyalkyl acrylate or methacrylate containing from two to four carbon atoms in the hydroxyalkyl group.

11. A composition according to claim 1 wherein the ethylenically unsaturated monomer is an ester of acrylic or methacrylic acid.

12. A composition according to claim 1 comprising:
  (a) a polyethylenically unsaturated polyurethane derived from:
    (i) from 1 to 99% by weight of a polyol having pendent fluoroalkyl groups, and
    (ii) from 99 to 1% by weight of a fluorine-free polyol or polyamine;
  (b) an ethylenically unsaturated monomer which is a liquid solvent for the unsaturated urethane component and is copolymerisable therewith, and
  (c) a photo-initiator composition.

13. A composition according to claim 12 wherein the fluorine-free polyol is a polyether diol.

14. A composition according to claim 4 wherein the polyethylenically unsaturated polyurethane comprises:
  (a) from 5 to 50% by weight of a di-acrylated polyurethane derived from a polyol obtained by the free radical addition of hexafluoropropene to polytetramethylene glycol of molecular weight from 500 to 3000, and
  (b) from 95 to 50% by weight of a di-acrylated polyurethane derived from a polyoxyalkylene diol of molecular weight from 500 to 2000.

15. A coated glass optical fibre obtainable by a process comprising the steps of:
  (a) drawing a glass fibre through a photocurable coating composition as defined in claim 1 and thereby forming a sheath of the composition on the fibre, and
  (b) subjecting the sheathed fibre to electromagnetic radiation to cure the sheath of photocurable composition.

* * * * *